United States Patent
Cankaya et al.

(10) Patent No.: US 7,698,617 B2
(45) Date of Patent: Apr. 13, 2010

(54) INTELLIGENT SWITCH AND METHOD FOR RETRANSMITTING A LOST PACKET TO DECODER(S)

(75) Inventors: Hakki C. Cankaya, Dallas, TX (US); Ljubisa Tancevski, Dallas, TX (US); Kamakshi Sridhar, Plano, TX (US)

(73) Assignee: Alcatel Lucent, Paris (FR)

( * ) Notice: Subject to any disclaimer, the term of this patent is extended or adjusted under 35 U.S.C. 154(b) by 1076 days.

(21) Appl. No.: 11/367,891

(22) Filed: Mar. 3, 2006

(65) Prior Publication Data
US 2007/0260921 A1    Nov. 8, 2007

(51) Int. Cl.
*H03M 13/00*    (2006.01)

(52) U.S. Cl. .............................. 714/751; 714/4; 714/18; 370/237

(58) Field of Classification Search ..................... 714/4, 714/18, 748, 751; 370/237
See application file for complete search history.

(56) References Cited

U.S. PATENT DOCUMENTS

| | | | | |
|---|---|---|---|---|
| 5,640,520 A | * | 6/1997 | Tetrick | 710/113 |
| 6,275,953 B1 | * | 8/2001 | Vahalia et al. | 714/11 |
| 6,335,933 B1 | * | 1/2002 | Mallory | 370/394 |
| 6,473,399 B1 | * | 10/2002 | Johansson et al. | 370/229 |
| 6,782,490 B2 | * | 8/2004 | Maxemchuk et al. | 714/18 |
| 6,842,461 B2 | * | 1/2005 | Harris | 370/465 |
| 7,000,174 B2 | * | 2/2006 | Mantha et al. | 714/790 |
| 7,333,439 B2 | * | 2/2008 | Itoh et al. | 370/252 |
| 7,421,644 B2 | * | 9/2008 | Mantha et al. | 714/800 |
| 2001/0049291 A1 | * | 12/2001 | Sato et al. | 455/503 |

OTHER PUBLICATIONS

U.S. Appl. No. 11/311,046, filed Dec. 19, 2005.
U.S. Appl. No. 11/311,081, filed Dec. 19, 2005, A. Agrawal et al.

* cited by examiner

*Primary Examiner*—Esaw T Abraham
(74) *Attorney, Agent, or Firm*—John E. Curtin

(57) ABSTRACT

An intelligent switch and method are described herein which help to effectively retransmit a lost packet that is associated with a television broadcast stream to one or more set-top boxes.

18 Claims, 7 Drawing Sheets

| | 2007 | 2010 | 2013 |
|---|---|---|---|
| ICC | 24949.5552 | 48837.4272 | 64408.7808 |
| ReTrans. | 64364.544 | 127401.984 | 168984.576 |

INTELLIGENT SWITCH AND METHOD FOR RETRANSMITTING A LOST PACKET TO DECODER(S)

BACKGROUND OF THE INVENTION

1. Field of the Invention

The present invention is related to an intelligent switch and a method for retransmitting a lost packet that is associated with a television broadcast stream to one or more decoders (set-top boxes).

2. Description of Related Art

The following abbreviations are herewith defined, at least some of which are referred to in the ensuing description of the prior art and the present invention.

| | |
|---|---|
| BTV | Broadcast Television |
| CO | Central Office |
| DSL | Digital Subscriber Line |
| DSLAM | Digital Subscriber Line Access Multiplexer |
| Gbps | Giga-bits-per-second |
| ICC | Instant Channel Change |
| SAI | Service Area Interface |
| SHE | Super Headend |
| STB | Set-Top Box |
| TV | Television |
| VHO | Video Hub Office |
| VOD | Video-On-Demand |

Referring to FIG. 1 (PRIOR ART), there is a block diagram that illustrates the basic components of an exemplary transport network 100 which can provide broadcast TV channels to homes via DSL phone lines. The exemplary transport network 100 shown includes two super head-ends 102, a backbone network 104, multiple VHOs 106, multiple IOs 108, multiple COs 110, multiple SAIs 112 and multiple STBs 114. In operation, each super head-end 102 (which includes a router 116) receives international TV feeds and supplies those international TV feeds via the backbone network 104 to each VHO 106. Then, each VHO 106 (which includes a router 118, intelligent switch 120, VoD server 122 and BTV server 124) receives local TV feeds and multicasts all of the TV feeds to their respective IOs 108. And, each IO 108 (which includes a router 126) then multicasts all of the TV feeds to their respective COs 110. Then, each CO 110 (which includes an intelligent switch 128) multicasts all of the TV feeds to their respective SAIs 112. And, each SAI 112 (which includes a DSLAM 130) then multicasts all of the TV feeds to their respective STBs 114. In this way, users can interface with their STB 114 and select one of the multicast TV channels to watch on their TV (not shown). The transport network 100 in addition to providing broadcast TV can also provide voice (telecommunications) and data (Internet) to the homes via DSL phone lines.

Each VHO 106 contains a BTV server 124 (multiple BTV servers 124 are possible) whose main purpose is to provide a rapid TV channel change functionality. This functionality is used when a user changes a TV channel and their STB 114 sends an ICC request/fast channel change request) to the BTV server 124 (e.g., delivery server 124). In response, the BTV server 124 unicasts the newly requested TV channel directly to that STB 114 so it can be displayed in a timely manner on the user's TV. Thus, the user will not have to experience an undesirable delay waiting for the new TV channel to be displayed on their TV.

The BTV server 124 also has a secondary purpose in which it is responsible for retransmitting a copy of a lost packet to STBs 114. This functionality is used when a STB 114 is tuned to a TV channel and it detects that there is a lost packet associated with a video stream of that TV channel. In this situation, the STB 114 sends a retransmission request for the lost packet back to the BTV server 124. And, the BTV server 124 then retransmits a copy of the packet back to that particular STB 114 using a unicast session. For example, assume a packet 132 is lost between one of the COs 110' and one of it's corresponding SAIs 112'. Then, each downstream STB 114' (only two shown) which happened to be tuned to the TV channel that is associated with the lost packet 132 sends a retransmission request 134 back to the BTV server 124. The BTV server 124 then retransmits (unicasts) two individual lost packets 132' directly back to the two requesting STBs 114'. It is fairly easy to see how the reception of multiple retransmission requests 134 for the same lost packet 132 and then the retransmission of multiple lost packets 132' back to the requesting STBs 114' can lead to a congestion problem. A second example is provided below to better illustrate this point.

In the second example, assume a packet 136 is lost between one of the IOs 108" and one of it's corresponding COs 110". Then, each downstream STB 114" (only four shown) which happened to be tuned to the TV channel that is associated with the lost packet 136 sends a retransmission request 138 back to the BTV server 124. The BTV server 124 then retransmits (unicasts) four individual packets 136' directly back to the four requesting STBs 114". Thus, depending on the location of the packet loss and the number of viewers (e.g., STBs 114' and 114") that happen to be affected by the packet loss it is possible to overload the BTV server 124. In fact, the BTV server 124 can receive an avalanche of retransmission requests 134 and 138 so it has to individually retransmit a large number of lost packets 132' and 136' directly back to the STBs 114' and 114". This can lead to two problems:

1. I/O Congestion at BTV server 124: The BTV server 124 has a limited output capacity (e.g., 2 Gbps) to serve both retransmission requests 134 and 138 and ICC requests from STBs 114. Therefore, the mentioned avalanche of retransmission requests 134 and 138 would likely create a congestion problem at the BTV server 124. FIG. 2 (PRIOR ART) is a graph which illustrates the estimated I/O bandwidth requirements in the future on a BTV server 124. As can be seen, this I/O problem is only going to get worse with the passage of time.

2. Transaction Congestion at BTV server 124: The BTV server 124 has to respond to retransmission requests 134 and 138 by locating the requested lost packets 132 and 136 in its buffer, establishing a unicast session, and retransmitting the lost packets 132' and 136' back to STBs 114' and 114". In addition, the BTV server 124 is responsible for handling ICC requests. Therefore, the mentioned avalanche would likely create an overload at the BTV server 124. FIG. 3 (PRIOR ART) is a graph which illustrates the estimated number of retransmission requests and ICC requests in the future that may be sent to the BTV server 124. As can be seen, this processing/transaction overload is only going to get worse with the passage of time.

Accordingly, there is a need for a new procedure to handle retransmission requests and the retransmissions of lost packets such that the BTV server 124 does not suffer from problems like I/O congestion and/or transaction congestion. This need and other needs are satisfied by the intelligent switch and method of present invention.

BRIEF DESCRIPTION OF THE INVENTION

The present invention includes an intelligent switch and a method for retransmitting a lost packet that is associated with a television broadcast stream to one or more STBs. In one embodiment, the intelligent switch functions as follows: (a) receives, from one of the STBs, a request for a retransmission of a lost packet; (b) forwards, to a BTV server, the request for the retransmission of the lost packet; (c) initiates a suppression period during which if subsequent request(s) for the retransmission of the same lost packet are received from other STB(s) then the subsequent request(s) would not be forwarded to the BTV server; (d) receives, from the BTV server, a retransmitted lost packet which is associated with the request for the retransmission of the lost packet; and (e) sends the retransmitted lost packet to the STB which sent the request for the retransmission of the lost packet and to the other STB(s) which sent the subsequent request(s) for the retransmission of the lost packet.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 4:
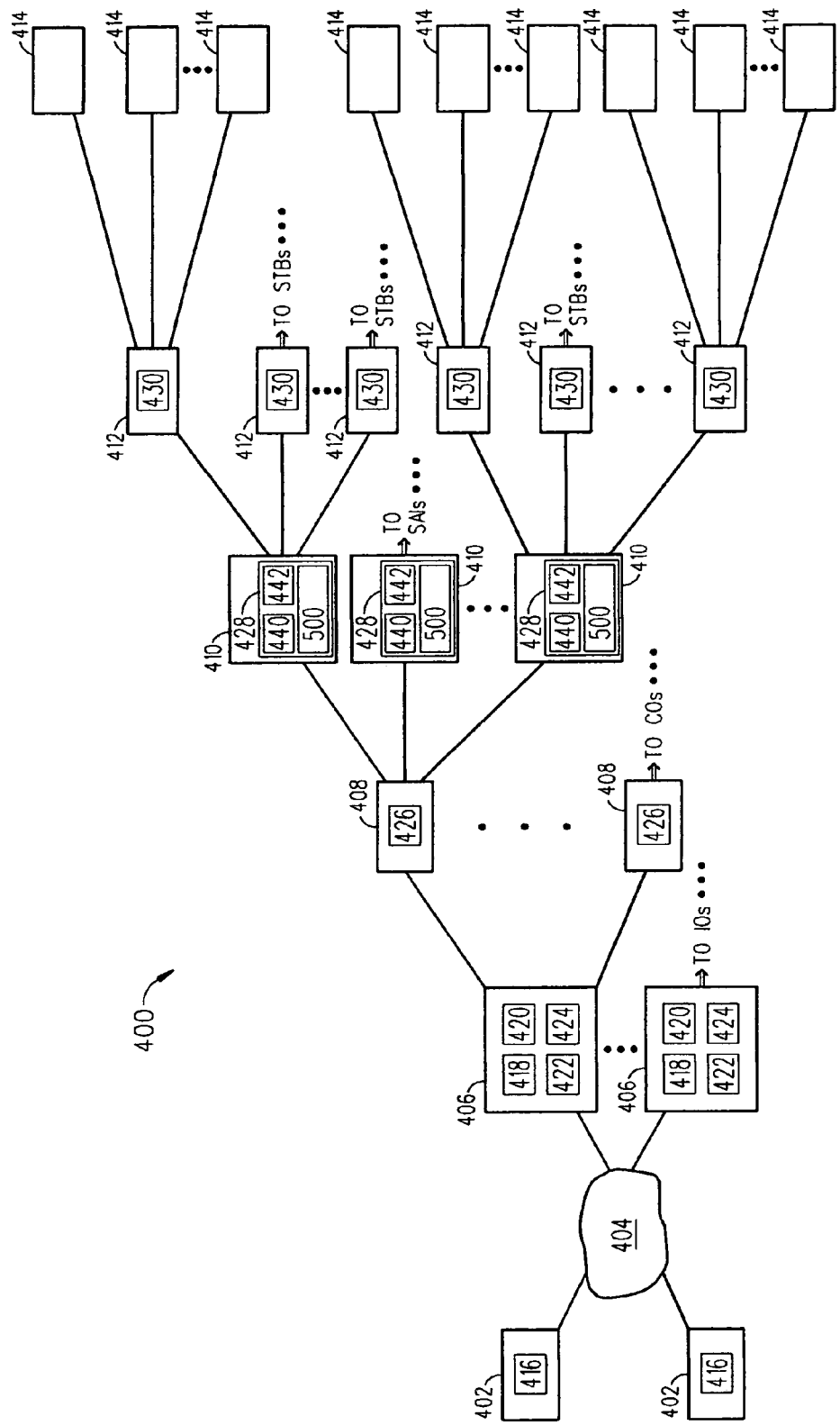
FIG. 4 is a block diagram that illustrates the basic components of an exemplary transport network which provides broadcast TV channels to homes via DSL phone lines in accordance with the present invention.

Referring to FIG. 4, there is a block diagram that illustrates the basic components of an exemplary transport network 400 which provides broadcast TV channels to homes via DSL phone lines in accordance with the present invention. The exemplary transport network 400 shown includes two super head-ends 402, a backbone network 404, multiple VHOs 406, multiple IOs 408, multiple COs 410, multiple SAIs 412 and multiple STBs 414. In operation, each super head-end 402 (which includes a router 416) receives international TV feeds and supplies those international TV feeds via the backbone network 404 to each VHO 406. Then, each VHO 406 (which includes a router 418, intelligent switch 420, VoD server 422 and BTV server 424) receives local TV feeds and multicasts all of the TV feeds to their respective IOs 408. And, each IO 408 (which includes a router 426) then multicasts all of the TV feeds to their respective COs 410. Then, each CO 410 (which includes an intelligent switch 428) multicasts all of the TV feeds to their respective SAIs 412. And, each SAI 412 (which includes a DSLAM 430) then multicasts all of the TV feeds to their respective STBs 414. In this way, users can interface with their STB 414 and select one of the multicast TV channels to watch on their TV (not shown). The transport network 400 in addition to providing broadcast TV can also provide voice (telecommunications) and data (Internet) to the homes via DSL phone lines.

Each VHO 406 contains a BTV server 424 (multiple BTV servers 424 are possible) whose main purpose is to provide a rapid TV channel change functionality. This functionality is used when a user changes a TV channel and their STB 414 sends an ICC request/fast channel change request to the BTV server 424 (e.g., delivery server 124). In response, the BTV server 424 unicasts the newly requested TV channel directly to that STB 414 so it can be displayed in a timely manner on the user's TV. Thus, the user will not have to experience an undesirable delay waiting for the new TV channel to be displayed on their TV.

The BTV server 424 also has a secondary purpose in which it is responsible for retransmitting a copy of a lost packet to STBs 414. In the past, if a STB 414 detected a lost packet within a video stream of a TV channel that is being viewed by a user, then that STB 414 would send a retransmission request for the lost packet back to the BTV server 424. And, the BTV server 424 would retransmit a copy of the lost packet back to that particular STB 414 using a unicast session. This traditional process is problematical because when a packet is lost then the BTV server 424 may receive an avalanche of retransmission requests from multiple STBs 414 and then have to retransmit/unicast an individual lost packet back to each one of those STBs 414 (see FIG. 1). The present invention addresses this problem by enabling the COs 410 and in particular the intelligent switches 428 therein to implement a method 500 which helps to effectively retransmit a copy of a lost packet to STBs 414. A detailed discussion about method 500 is provided next with respect to FIG. 5.

Figure 5:
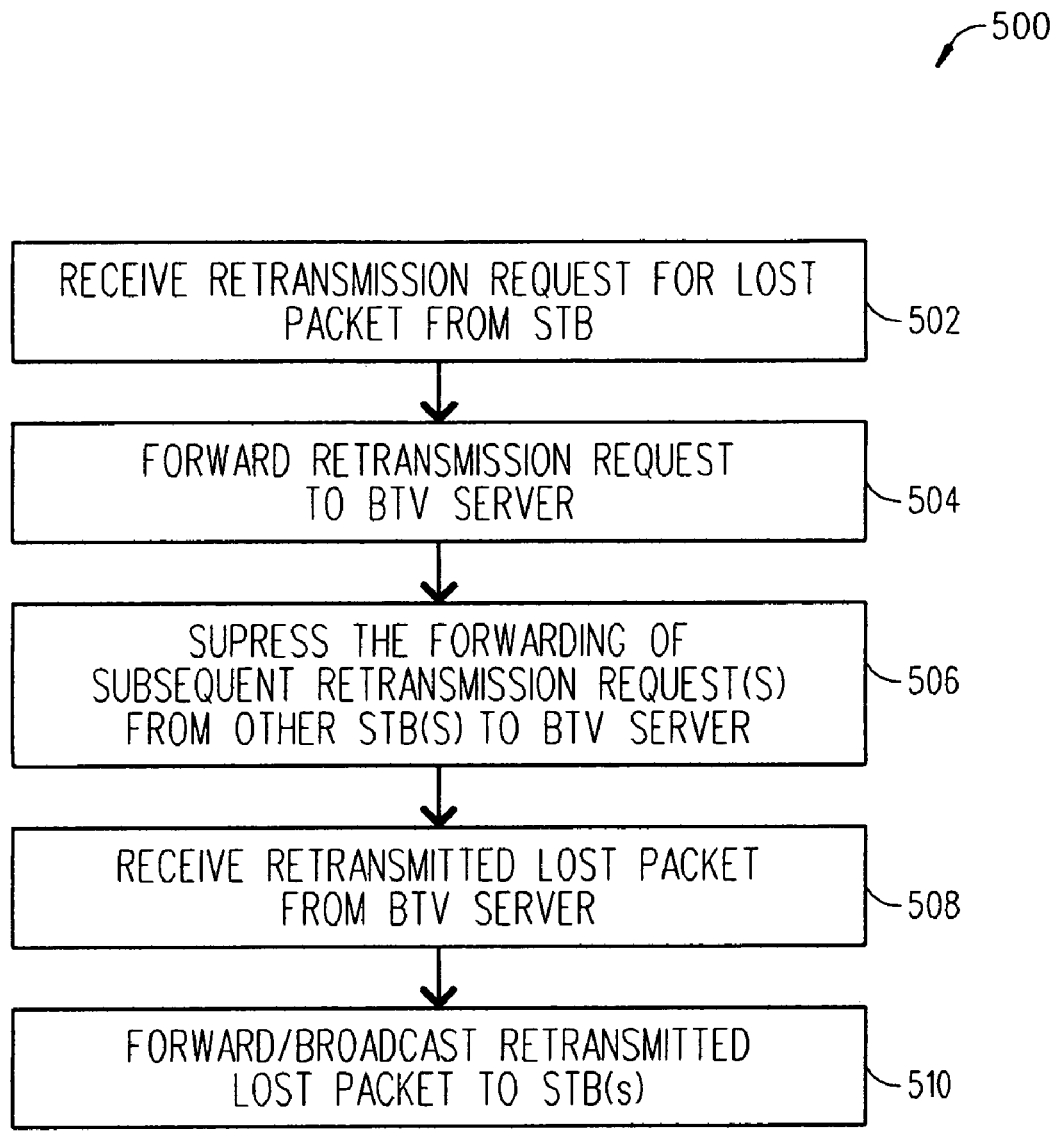
FIG. 5 is a flowchart that illustrates the basic steps of a method which can be implemented by an intelligent switch located within a CO shown in FIG. 4 to effectively retransmit a lost packet to one or more STBs in accordance with the present invention.

Referring to FIG. 5, there is a flowchart illustrating the basic steps of the method 500 which can be implemented by the intelligent switches 428 located within the COs 410 to help effectively retransmit a lost packet to STBs 414 in accordance with the present invention. Each intelligent switch 428 has a memory 440 which stores instructions that are processable by a processor 442 so that the processor 442 can facilitate the following operations: (a) receive, from one of the STBs 414, a request for a retransmission of a lost packet (step 502); (b) forward, to the BTV server 424, the request for the retransmission of the lost packet (step 504); (c) initiate a suppression period during which if subsequent request(s) for the retransmission of the same lost packet are received from other STB (s) 414 then the subsequent request(s) would not be forwarded to the BTV server 424 (step 506); (d) receive, from the BTV server 424, a retransmitted lost packet which is associated with the request for the retransmission of the lost packet (step 508); and (e) send the retransmitted lost packet to the STB 414 which sent the request for the retransmission of the lost packet and to the other STB(s) 414 which sent the subsequent request(s) for the retransmission of the lost packet (step 510). Two exemplary scenarios are provided next which help illustrate the various steps and advantages associated with the present invention.

Figure 6:
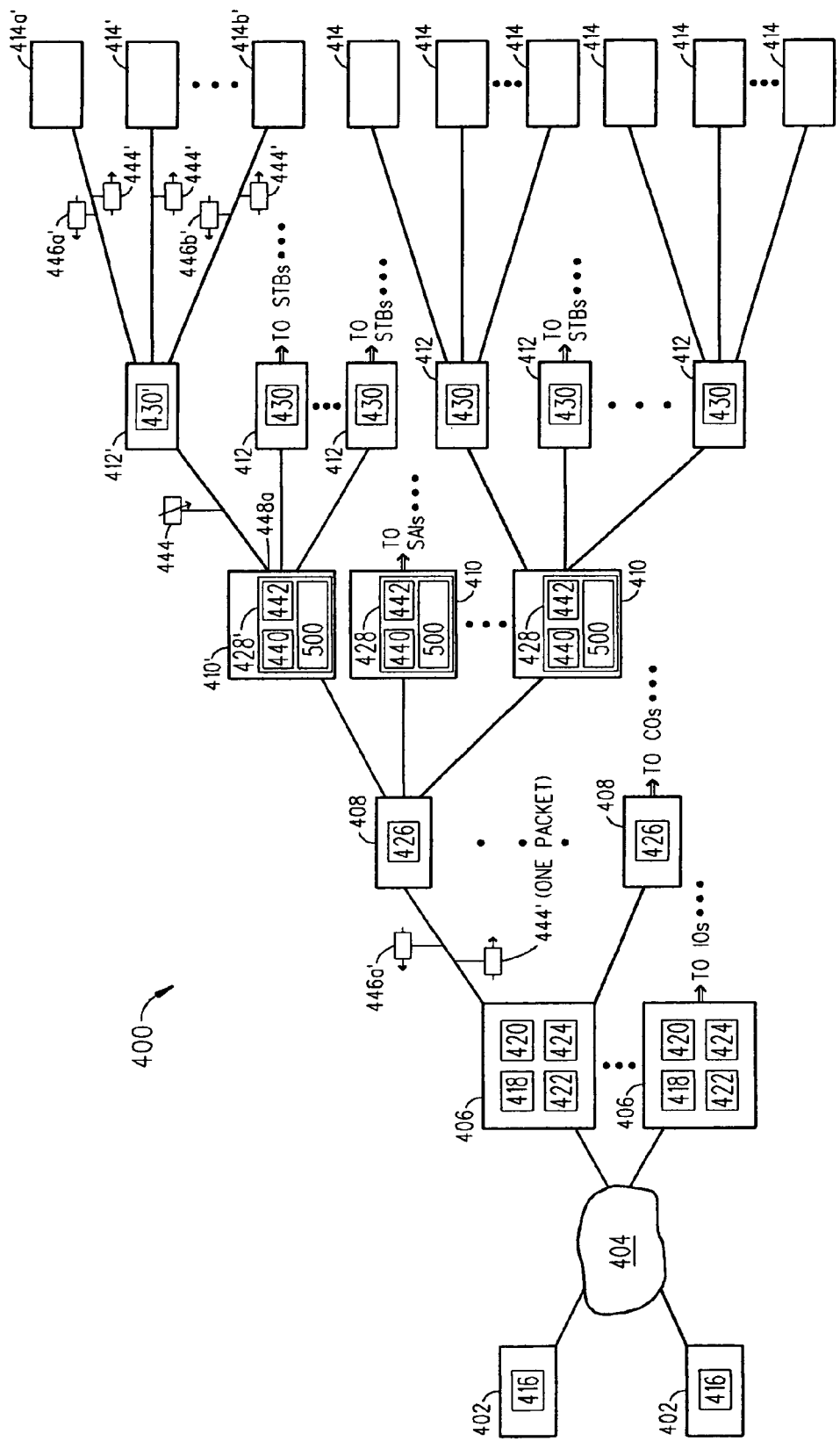
FIG. 6 is a block diagram of the exemplary transport network shown in FIG. 4 which is used to help explain one scenario where the intelligent switch can implement the method shown in FIG. 5 to effectively retransmit a lost packet to one or more STBs in accordance with the present invention.

Referring to FIG. 6, there is a block diagram of the exemplary transport network 400 which is used to help explain one scenario where an intelligent switch 428 implements the basic steps of method 500 to effectively retransmit a lost packet to one or more STBs 414 in accordance with the present invention. In this scenario, assume a packet 444 is lost between one of the COs 410' and one of it's corresponding SAIs 412'. And, assume that two STBs 414a' and 414b' happened to be tuned to the TV channel which is associated with the lost packet 444. In this case, the STBs 414a' and 414b' would respectively transmit retransmission requests 446a' and 446b' so they can each receive a copy of the lost packet 444.

In addition, assume that the intelligent switch 428' receives the retransmission request 446a' from STB 414a' before it receives the retransmission request 446b' from STB 414b' (see step 502). In this case, the intelligent switch 428' forwards the retransmission request 446a' to the BTV server 424 (see step 504). At this time, the intelligent switch 428' also initiates a suppression period during which if subsequent retransmission requests 446 (such as retransmission request 446b') for the same lost packet 444 are received from other STBs 414' (such as STB 414b') then those subsequent retransmission requests 446 would not be forwarded to the BTV server 424 (step 506).

In one embodiment, the suppression period has a variable time-out parameter which is used to end the suppression period. Basically, the time-out parameter ends the suppression period if no other retransmission request 446 for the same lost packet 444 arrives within a predetermined time. In addition, the time-out parameter is application specific so that it can be set long enough to cover the typical time difference between the first and last retransmission requests 446 which are caused by the loss of one packet 444. Moreover, the intelligent switch 428' maintains and uniquely identifies this suppression period within a database table by using a TV channel number, a lost packet identification number, and a port(s) 448 (such as port 448a) which happened to receive the retransmission requests 446' (such as retransmission requests 446a' and 446b').

Upon receiving the retransmitted request 446a', the BTV server 424 sends one retransmitted lost packet 444' to the intelligent switch 428' (see step 508). The intelligent switch 428' uses the database table to associate the retransmitted lost packet 444' to retransmission requests 446a' and 446b'. Then, the intelligent switch 428' sends the retransmitted lost packet 444' to STB 414a' which sent the retransmission request 446a' and to STB 414b' which sent the subsequent retransmission request 446b' (see step 510). In particular, the intelligent switch 428' forwards the retransmitted lost packet 444' out port 448a (which received the retransmission requests 446a' and 446b') to STBs 414a' and 414b' and to other STBs 414' associated with the same SAI 412'.

Figure 7:
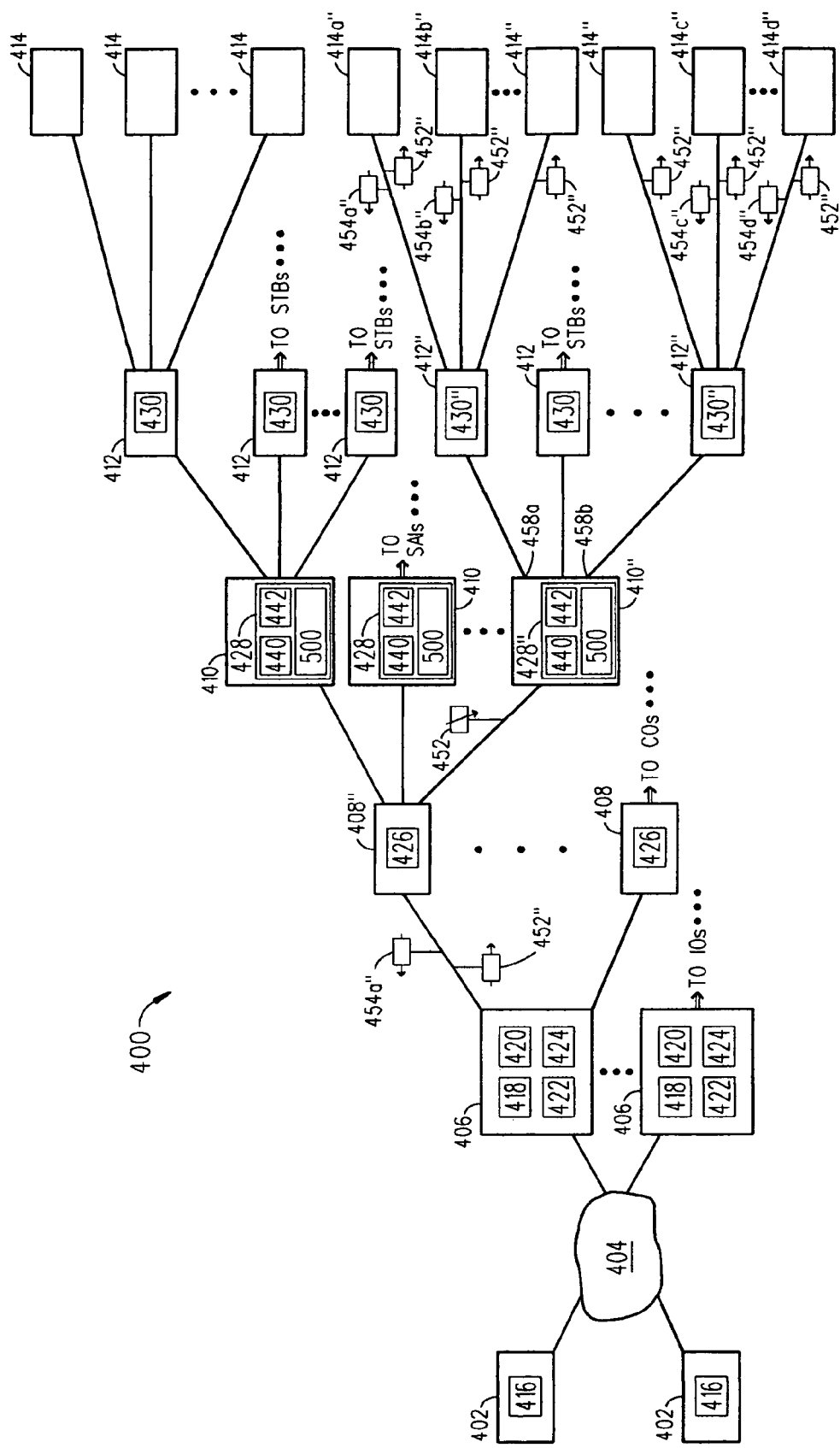
FIG. 7 is a block diagram of the exemplary transport network shown in FIG. 4 which is used to help explain another scenario where the intelligent switch can implement the method shown in FIG. 5 to effectively retransmit a lost packet to one or more STBs in accordance with the present invention.

Referring to FIG. 7, there is a block diagram of the exemplary transport network 400 which is used to help explain another scenario where an intelligent switch 428 implements the basic steps of method 500 to effectively retransmit a lost packet to one or more STBs 414 in accordance with the present invention. In this scenario, assume a packet 452 is lost between one of the IOs 408" and one of it's corresponding COs 410". And, assume that four STBs 414a", 414b", 414c" and 414d" happened to be tuned to the TV channel which is associated with the lost packet 452. In this case, the STBs 414a", 414b", 414c" and 414d" would respectively transmit retransmission requests 454a", 454b", 454c" and 454d" so they can each receive a copy of the lost packet 452.

In addition, assume that the intelligent switch 428" receives the retransmission request 454a" from STB 414a" before it receives the retransmission requests 454b", 454c" and 454d" from STBs 414b", 414c" and 414d" (see step 502). In this case, the intelligent switch 428" forwards the retransmission request 454a" to the BTV server 424 (see step 504). At this time, the intelligent switch 428" also initiates a suppression period during which if subsequent retransmission requests 454" (such as retransmission requests 454b", 454c" and 454d") for the same lost packet 452 are received from other STBs 414" (such as STBs 414b", 414c" and 414d") then those subsequent retransmission requests 454" would not be forwarded to the BTV server 424 (step 506). The intelligent switch 428" maintains and uniquely identifies this particular suppression period in a database table by using a TV channel number, a lost packet identification number, and ports 458a and 458b which happened to receive the retransmission requests 454a", 454b", 454c" and 454d".

Upon receiving the retransmitted request 454a", the BTV server 424 sends one retransmitted lost packet 452" to the intelligent switch 428" (see step 508). The intelligent switch 428" uses the database table to associate the retransmitted lost packet 452" to retransmission requests 454a", 454b", 454c" and 454d". Then, the intelligent switch 428" sends the retransmitted lost packet 452" to STB 414a" which sent the retransmission request 454a" and to STBs 414b", 414c" and 414d" which sent the subsequent retransmission request 454b", 454c" and 454d" (see step 510). In particular, the intelligent switch 428" broadcasts the retransmitted lost packet 452" out of ports 458a and 458b (which received the retransmission requests 454a", 454b", 454c" and 454d") to STBs 414a", 414b", 414c" and 414d" and to the other STBs 414" associated with SAIs 412".

Figure 8:
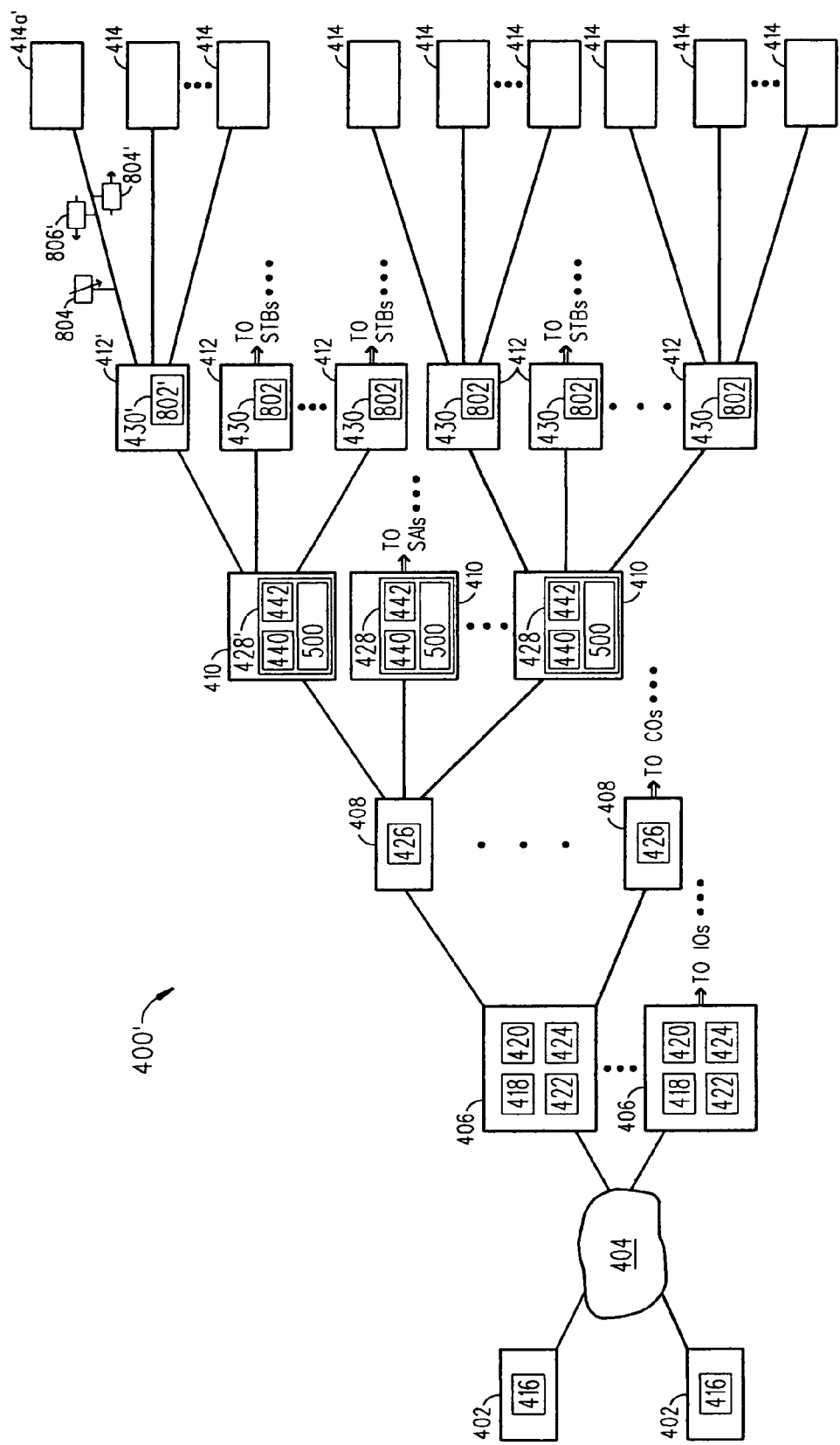
FIG. 8 is a block diagram of an enhanced transport network which has distributed BTV server(s) and also has the intelligent switch which can implement the method shown in FIG. 5 to effectively retransmit a lost packet to one or more STBs in accordance with the present invention.

Referring to FIG. 8, there is a block diagram of an exemplary transport network 400' which has been enhanced to have BTV server(s) 802 located in the SAIs 412 in addition to having BTV server(s) 424 located in the VHOs 406. The placement of BTV server(s) 802 within the SAIs 412 is done to improve the rapid TV channel change functionality as described in the following documents:

U.S. patent application Ser. No. 11/311,046 filed on Dec. 19, 2005 and entitled "Rapid Media Channel Changing Mechanism and Access Network Node Comprising Same".

U.S. patent application Ser. No. 11/311,081 filed on Dec. 19, 2005 and entitled "Access Node Capable of Dynamic Channel Caching".

The contents of these documents are incorporated by reference herein.

The transport networks described in these two documents do not discuss the method 500 of the present invention. However, those transport networks like the transport network 400' described herein can be enhanced by enabling their intelligent switches 428 to implement the method 500 shown in FIG. 5. Of course, the addition of BTV server(s) 802 will affect the retransmission of lost packets as described in the following example. Assume that a BTV server 802' is located in SAI 412' and that a packet 804 was lost somewhere downstream of that SAI 412'. In this case, the retransmission request 806' sent from STB 414*a'* (for instance) would not make it to the intelligent switch 428'. Because, the BTV server 802' would handle the retransmission request 806' and unicast a retransmitted lost packet 804' directly to the requesting STBs 414*a'*. However, if the packet 804 had been lost upstream of the SAI 412' then the intelligent switch 428' would implement the method 500 discussed above with respect to FIGS. 4-7.

From the foregoing, it can be seen that the present invention enables the following: (1) suppression of subsequent retransmission requests which are caused by the same packet loss at the intelligent switch 428 so they can not reach the BTV server 424; (2) retransmission of a single copy of the lost packet from the BTV server 424 to the intelligent switch 428; and (3) initialization of a forwarding/broadcasting of the retransmitted lost packet to the relevant STBs 414. The retransmitted lost packet can be forwarded/broadcasted to the relevant STBs 414 as follows:

1. If the suppressed retransmission requests for a lost packet had arrived at one single port within the intelligent switch 428, then the retransmitted lost packet would be forwarded down link to the corresponding STBs 414 (see FIG. 6).
2. If the suppressed retransmission requests for a lost packet had arrived at multiple ports within the intelligent switch 428, then the retransmitted lost packet would be broadcasted out of those multiple ports to the corresponding STBs 414 (see FIG. 7).
3. The intelligent switch 428 could unicast the retransmitted lost packet only to requesting STBs. However, this would require a bigger state table than would be needed if anyone of the two previous ways was used to retransmit the lost packet.

Figure 1:
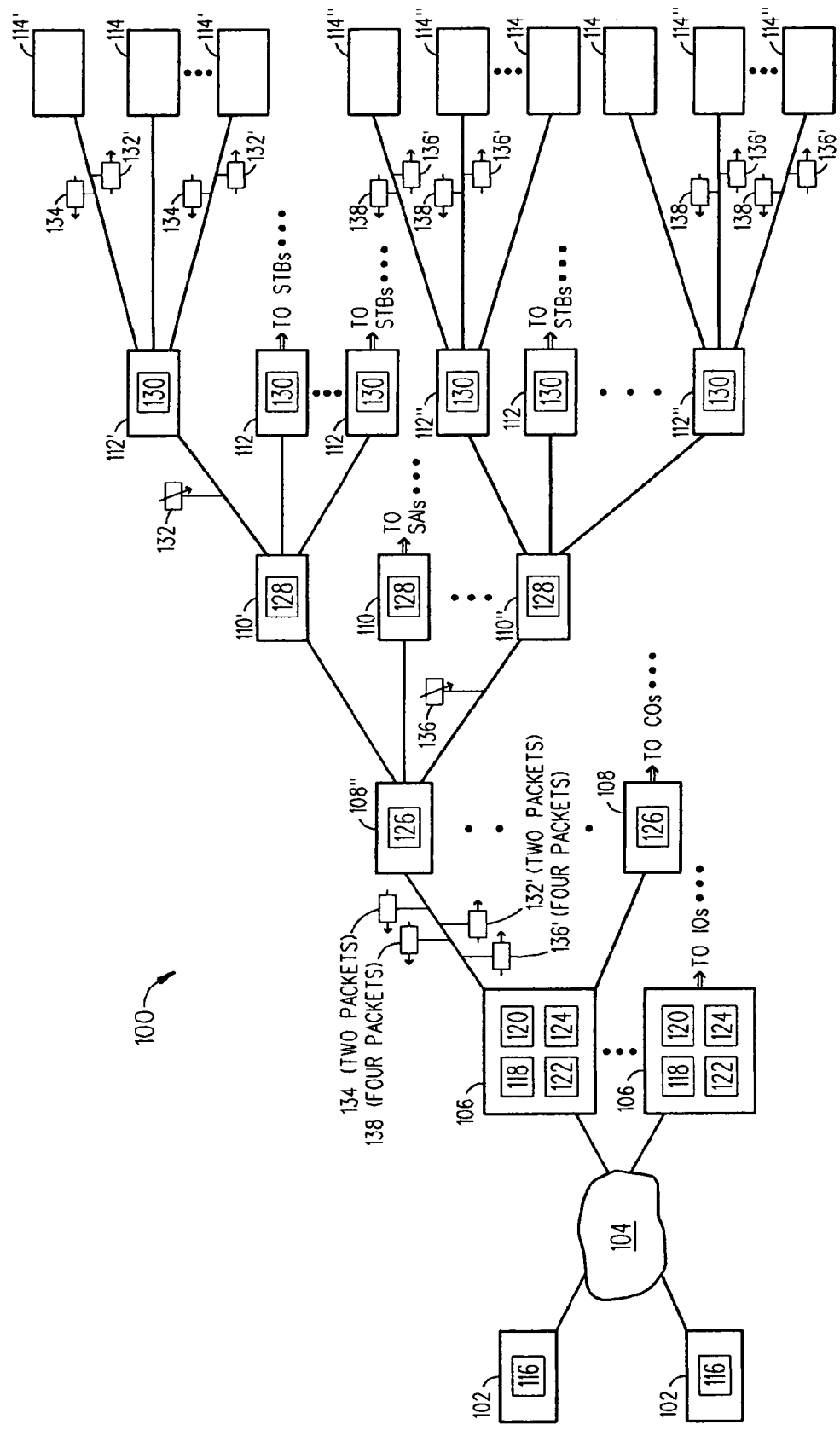
FIG. 1 (PRIOR ART) is a block diagram that illustrates the basic components of an exemplary transport network which provides broadcast TV channels to homes via DSL phone lines.
Figure 2:
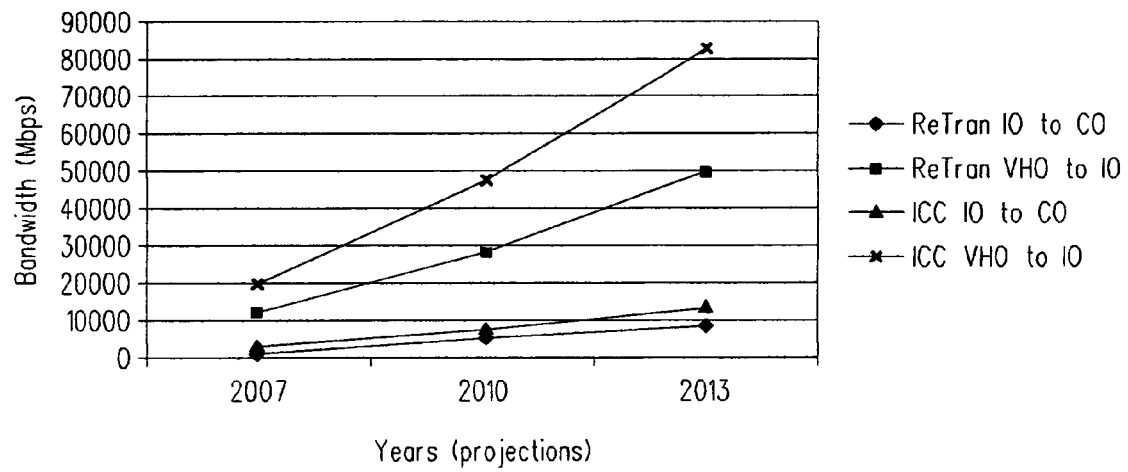
FIG. 2 (PRIOR ART) is a graph that illustrates the estimated future I/O bandwidth requirements on a BTV server which is used to help explain why there is a need for the present invention.
Figure 3:
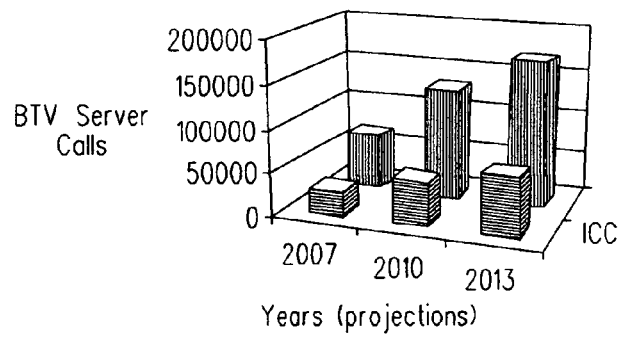
FIG. 3 (PRIOR ART) is a graph that illustrates the estimated number of future retransmission requests and future ICC requests that will be sent to the BTV which is used to further help explain why there is a need for the present invention.

As can be seen, the present invention provides an effective solution which helps prevent I/O and transaction congestions at the BTV server 424 (see FIGS. 1-3). And, by using the present invention, a lost packet will cause only one I/O and transaction at the BTV server 424 (if it is lost between an IO 408 and it's corresponding STBs 414). This considerably increases the effectiveness and performance of the BTV server 424. Since, the BTV server 424 will not be overwhelmed with retransmission requests while it performs it's main service which is the ICC functionality.

The present invention has been described herein as being implemented by the intelligent switches 428 located within the COs 410. However, it should be appreciated that the present invention can also be implemented by intelligent switches that are located in other areas such as in the SAIs 412, IOs 408 or VHOs 406. And, it should be appreciated that the configuration of transport networks 400 and 400' shown herein is exemplary and that the present invention can be implemented in transport networks which happen to have a different configuration. Moreover, it should be appreciated that anyone of the intelligent switches 428 can process more than one lost packet at any given time.

Although one embodiment of the present invention has been illustrated in the accompanying drawings and described in the foregoing detailed description, it should be understood that the invention is not limited to the embodiment disclosed, but is capable of numerous rearrangements, modifications and substitutions without departing from the spirit of the invention as set forth and defined by the following claims.

What is claimed is:

1. A method for retransmitting a lost packet to one or more decoders, said method comprising the steps of:
   receiving a request for retransmission of a lost packet from one of the one or more decoders;
   forwarding the request to a server;
   initiate a suppression time period, during which time subsequent requests for retransmission of the lost packet are not forwarded to the server, using a time-out parameter which is variable and application specific;
   receiving a retransmitted lost packet associated with the request from the server; and
   sending the retransmitted lost packet to said one decoder which sent the request and to other decoders which sent the subsequent requests.

2. The method of claim 1, wherein said sending step further includes a step of forwarding the retransmitted lost packet from one port towards said one decoder and said other decoders when said request and said subsequent requests are received at said one port.

3. The method of claim 1, wherein said sending step further includes a step of broadcasting the retransmitted lost packet from multiple ports towards said one decoder and said other decoders when said request and said subsequent requests are received at said multiple ports.

4. The method of claim 1, wherein said suppression time period is uniquely identified in a database table by:
   a TV channel number;
   a lost packet identification number; and
   one or more ports which received said request and said subsequent requests.

5. The method of claim 1, wherein said server is a broadcast television server.

6. The method of claim 1, wherein said decoder and said other decoders are set-top boxes.

7. The method of claim 1, wherein said lost packet is associated with a television broadcast stream.

8. A system comprising,
   a switch that comprises:
   a plurality of ports;
   a processor; and
   a computer readable memory medium for storing accessible instructions wherein the processor accesses instructions from said memory and processes the accessible instructions to facilitate:
      reception of a request for a retransmission of a lost packet from a decoder;
      forwarding the request to a server;
      initiating a suppression time period during which time subsequent requests for retransmission of the lost packet are not forwarded to the server, using a time-out parameter which is variable and application specific;
      receiving a retransmitted lost packet associated with the request from the server; and
      sending the retransmitted lost packet to said one decoder and to other decoders which sent the subsequent requests.

9. The system of claim 8, wherein said switch processor further accesses additional instructions from said memory and processes the additional instructions to facilitate forwarding the retransmitted lost packet from one of the ports towards said one decoder and said other decoders when said request and said subsequent requests are received at said one port.

10. The system of claim 8, wherein said switch processor further accesses additional instructions from said memory and processes the additional instructions to facilitate broadcasting the retransmitted lost packet from multiple ports towards said one decoder and said other decoders when said request and said subsequent requests are received at said multiple ports.

11. The system of claim 8, wherein said switch further comprises a database which comprises a table that uniquely identifies said suppression time period by:
- a TV channel number;
- a lost packet identification number; and
- said ports which received said request and said subsequent requests.

12. The system of claim 8, wherein said lost packet is associated with a television broadcast stream.

13. The system of claim 8 further comprising a plurality of switches.

14. The system of claim 8 further comprising a video hub office.

15. The system of claim 8 further comprising a plurality of set-top boxes.

16. The system of claim 8 further comprising a plurality of service area interfaces.

17. The system of claim 8 further comprising a plurality of intermediate offices.

18. The system of claim 8 further comprising a plurality of central offices.

* * * * *